US009753165B2

(12) United States Patent
Alhukail et al.

(10) Patent No.: US 9,753,165 B2
(45) Date of Patent: Sep. 5, 2017

(54) SYSTEM, MACHINE, AND COMPUTER-READABLE STORAGE MEDIUM FOR FORMING AN ENHANCED SEISMIC TRACE USING A VIRTUAL SEISMIC ARRAY

(71) Applicant: Saudi Arabian Oil Company, Dhahran (SA)

(72) Inventors: Ibrahim Abdulaziz Alhukail, College Station, TX (US); Luc Ikelle, Bryan, TX (US)

(73) Assignees: Saudi Arabian Oil Company, Dhahran (SA); The Texas A&M University System, College Station, TX (US)

( * ) Notice: Subject to any disclaimer, the term of this patent is extended or adjusted under 35 U.S.C. 154(b) by 0 days.

(21) Appl. No.: 14/981,065

(22) Filed: Dec. 28, 2015

(65) Prior Publication Data
US 2016/0131779 A1 May 12, 2016

Related U.S. Application Data

(60) Division of application No. 13/225,067, filed on Sep. 2, 2011, now Pat. No. 9,354,337, which is a
(Continued)

(51) Int. Cl.
*G01V 1/28* (2006.01)
*G01V 1/32* (2006.01)

(52) U.S. Cl.
CPC .............. *G01V 1/28* (2013.01); *G01V 1/32* (2013.01); *G01V 2210/55* (2013.01); *G01V 2210/57* (2013.01)

(58) Field of Classification Search
CPC ....................................................... G01V 1/28
(Continued)

(56) References Cited

U.S. PATENT DOCUMENTS 3,766,519 A 10/1973 Stephenson
4,758,998 A 7/1988 Johnson
(Continued)

OTHER PUBLICATIONS

Wang et al., "Time Domain Approach to Wideband Source Location", 1990, IEEE, pp. 2831-2834.*
(Continued)

*Primary Examiner* — Ricky Ngon
(74) *Attorney, Agent, or Firm* — Bracewell LLP; Constance G. Rhebergen; Christopher L. Drymalla

(57) ABSTRACT

Embodiments of a system are provided for forming enhanced seismic array traces using virtual seismic sensors in addition to the real seismic sensors to form a virtual seismic array. The system receives the signal responses from the real sensors, processes the signal responses from the sensors to define virtual signals using a narrowband decomposition of the complex envelope of the sensor signal responses, calculates second- and fourth-order statistics to derive steering vectors for the array of real sensors, and forms a virtual seismic array in response thereto. Machines, computer program product, and computer-implemented methods are provided for forming enhanced seismic array traces by receiving the array responses from sensors, processing the signals to define virtual sensor signals and a virtual seismic array, and forming an array response for the virtual seismic array to form a seismic trace of enhanced resolution.

21 Claims, 6 Drawing Sheets

Related U.S. Application Data continuation of application No. 13/032,109, filed on Feb. 22, 2011, now abandoned.

(60) Provisional application No. 61/306,657, filed on Feb. 22, 2010.

(58) Field of Classification Search
USPC .................................................. 702/17, 70
See application file for complete search history.

(56) References Cited

U.S. PATENT DOCUMENTS

| | | | |
|---|---|---|---|
| 4,887,244 | A | 12/1989 | Willis et al. |
| 5,103,429 | A | 4/1992 | Gelchinsky |
| 5,173,880 | A | 12/1992 | Duren |
| 5,459,668 | A | 10/1995 | Dogan |
| 5,570,305 | A | 10/1996 | Fattouche |
| 5,971,095 | A | 10/1999 | Ozbek |
| 6,867,731 | B2 | 3/2005 | Dizaji |
| 7,453,765 | B2 | 11/2008 | Ikelle |
| 7,505,362 | B2 | 3/2009 | Anderson et al. |
| 8,219,320 | B2 | 7/2012 | Saenger |
| 9,261,613 | B2 | 2/2016 | Auger |
| 2005/0195103 | A1 | 9/2005 | Davis et al. |
| 2007/0274155 | A1 | 11/2007 | Ikelle |
| 2008/0049551 | A1 | 2/2008 | Muyzert et al. |
| 2008/0106974 | A1 | 5/2008 | Bergery |
| 2009/0034756 | A1 | 2/2009 | Volker |
| 2009/0093964 | A1 | 4/2009 | Albera |
| 2010/0054083 | A1* | 3/2010 | Stork ............... G01V 1/28 367/53 |
| 2014/0288838 | A1 | 9/2014 | Trickett |
| 2015/0117149 | A1 | 4/2015 | Edme et al. |
| 2015/0124560 | A1 | 5/2015 | Li et al. |
| 2016/0018543 | A1 | 1/2016 | Ferber |
| 2016/0054463 | A1 | 2/2016 | Chiu |

OTHER PUBLICATIONS

Ikelle, et al., "Introduction to Petroleum Seismology" 2005, SEG, vol. 12, pp. 182-214.

PCT International Search Report dated May 31, 2012, International Application No. PCT/US2011/025681, International Filing Date: Feb. 22, 2011.

Chevalier, P. et al., "On the Virtual Array Concept for Higher Order Array Processing" XP011128360; IEEE Transactions on Signal Processing; Apr. 1, 2005; ICEE Service Center, New York, NY; vol. 47 No. 9; pp. 1254-1271.

Chevalier, P. et al., "On the Virtual Array Concept for the Fourth-Order Direction Finding Problem" XP011058679; IEEE Transactions on Signal Processing; Sep. 1, 1999; ICEE Service Center, New York, NY; vol. 47 No. 9; pp. 2592-2595.

Dogan, M.C., et al., "Applications of Cumulants to Array Processing—Part 1: Aperture Extension and Array Calibration" IEEE Transactions on Signal Processing; May 1995, vol. 43 No. 5; pp. 1200-1216.

Alhukail, et al., "Virtual Seismic Array" SEG Houston 2009 International Exposition and Annual Meeting; pp. 86-89.

Xu, Sheng, et al.; "Antileakage Fourier transform for seismic data regularization in higher dimensions" Geophysics, vol. 75, No. 6 (Nov.-Dec. 2010); pp. 113-120.

\* cited by examiner

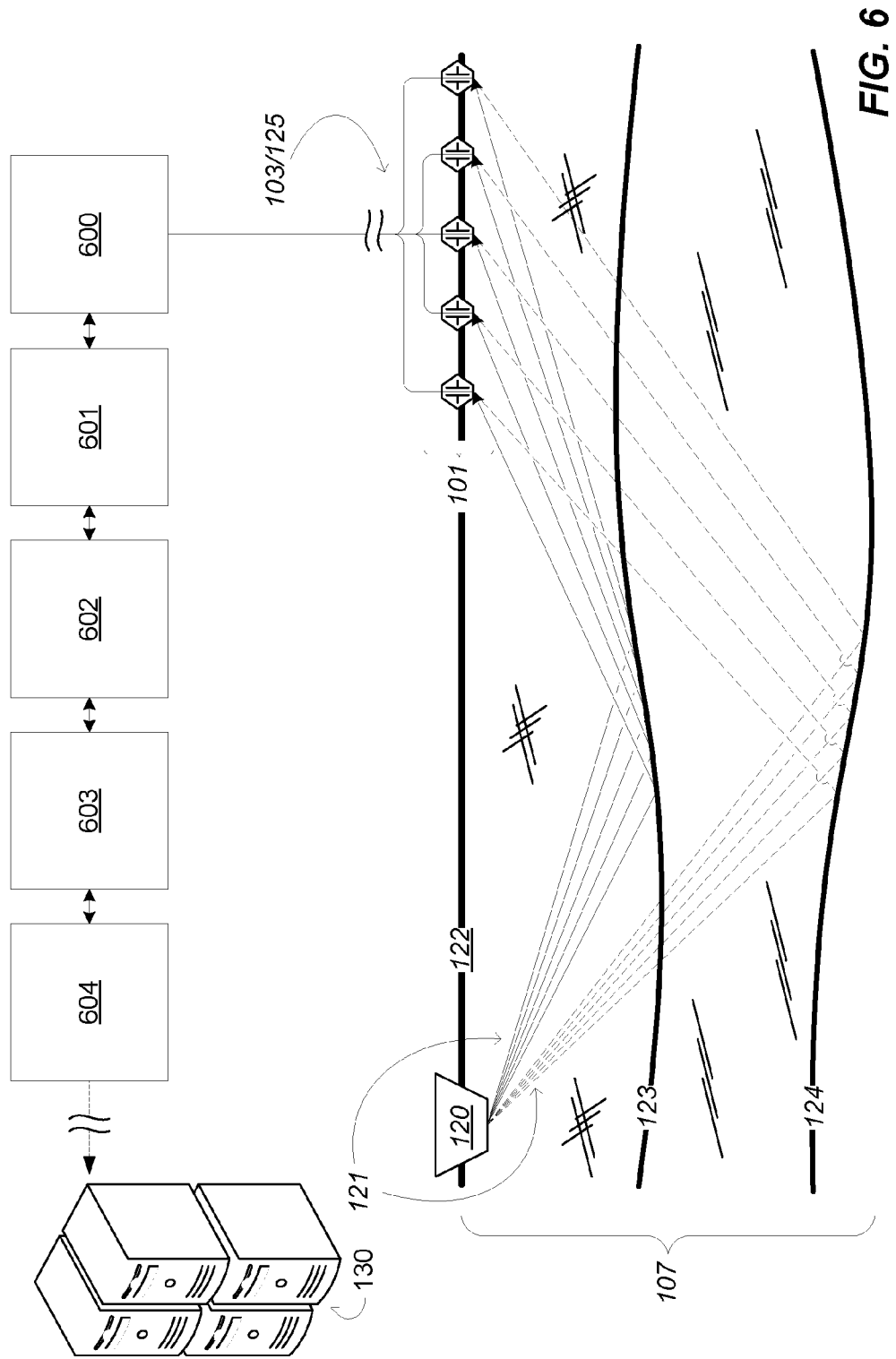

SYSTEM, MACHINE, AND COMPUTER-READABLE STORAGE MEDIUM FOR FORMING AN ENHANCED SEISMIC TRACE USING A VIRTUAL SEISMIC ARRAY

RELATED APPLICATIONS

This application is a divisional of U.S. patent application Ser. No. 13/225,067, filed on Sep. 2, 2011, titled "System, Machine, and Computer-Readable Storage Medium for Forming and Enhanced Seismic Trace Using a Virtual Seismic Array, which is a continuation of U.S. patent application Ser. No. 13/032,109, filed on Feb. 22, 2011, titled "System, Machine, and Computer-Readable Storage Medium for Forming an Enhanced Seismic Trace Using a Virtual Seismic Array" (now abandoned), which claims priority to U.S. Provisional Patent Application No. 61/306,657 filed Feb. 22, 2010, titled "System, Machine, Program Product, and Computer-Implemented Method for Forming an Enhanced Seismic Trace Using a Virtual Seismic Array." Each of these previous applications is incorporated herein by reference in its entirety.

BACKGROUND OF THE INVENTION

Field of the Invention

The present invention relates generally to seismology. More specifically, the present invention relates to embodiments for forming a seismic trace responsive to seismic signals received at seismic sensors.

Description of the Related Art

Hydrocarbon deposits are often trapped thousands of feet below the Earth's surface. The exploration for such hydrocarbons, particularly with respect to the discovery and analysis of subterranean petroleum deposits, typically employs seismology techniques for imaging the geological structure of the Earth's subsurface. For example, seismic energy waves from an energy source are propagated through the Earth's subsurface and are at least partially reflected through the Earth's subsurface upon being propagated through various forms of subterranean matter having divergent impedances. Particularly, when a seismic energy wave encounters a boundary between two different materials with different impedances, at least some of the energy will be reflected off the boundary. The reflected seismic energy can then be received at predetermined locations, such as on land, within the sea, or in boreholes using strategically positioned sensors to receive the seismic energy as a signal and to collect and to record data concerning the received seismic energy. The recorded data, which may include properties such as the arrival time and the magnitude of the reflected energy, can be processed to determine the depth and physical properties of the reflecting geological structure. For example, changes in signal properties allow inferences regarding changes in seismic impedances, which thereby allow inferences regarding the properties of the underlying geologic structure, such as the density and elastic modulus of the subsurface matter.

Generally, seismic imaging requires directing an intense sound from a seismic energy source device into the ground to evaluate subsurface conditions and to detect possible concentrations of oil, gas, and other subsurface minerals. Seismic sensor devices, known as geophones, record sound wave echoes that come back up through the ground to the recording surface. Such seismic sensor devices, or geophones, can record the intensity of such sound waves and the time it took for the sound wave to travel from the sound source device back to the geophone recording device at the recording surface. The reflections of sound waves emitted by the sound source device, and recorded by the geophone recording device, can be processed by a computer to generate a three-dimensional digital model, or seismic image, of the subsurface. The three-dimensional model of the subsurface can be used to identify, for example, the placement of reservoirs and potential well flow paths.

The recorded data is processed, and then the results are used to map the Earth's subsurface structure, such as the structure of rock formations, producing a graphical model of the structure and physical properties of the Earth's subsurface. The results obtained are usually not unique, meaning that more than one model can be found to adequately fit the data. Therefore, a paramount consideration in seismology is to measure the reflected energy in a way that most accurately and completely captures the true geologic subsurface properties of the Earth, and to then extract from those measurements as much information as possible to accurately and completely represent the true geologic structure.

Conventional seismic acquisition systems use an array of strategically positioned seismic sensors; the array is also called a receiver and is typically composed of between 6 and 24 sensors. The sensors in the receiver measure the reflected seismic energy to form the seismic response. The acquisition system collects data corresponding to the measured reflected energy of the receiver, then sums the data for a particular time (t) to produce a seismic response associated with the receiver, which is also known as a seismic trace. Conventional seismic imaging systems may perform the summation using hardwired logic so that all wave fronts recorded by the sensors at a time (t) are directly summed irrespective of the data quality or any potential sensor malfunction. Although hardwired summation may prove efficient in terms of acquisition speed and turnaround time, this method is susceptible to errors and inaccuracies that can cause an inaccurate and incomplete depiction the true geological structure of the subsurface.

Common errors and inaccuracies include, for example, noise leakage due to aliasing, improper summation due to malfunctioning sensors, the introduction of non-geologic seismic effects, source and receiver variation, coherent noises, and electrical noise or spikes. Conventional systems can provide correction functions, which are more commonly adopted today, filter the collected data for noise and aliased data, correct for actual or potential sensor malfunctions, and correct for any non-geologic seismic effects before summing the seismic sensors to produce the seismic trace.

SUMMARY OF THE INVENTION

Although conventional acquisition methods are able to correct abnormalities in the data as described above, there remain significant practical challenges in seismology due to limitations in producing models of a desired resolution. Accordingly, there is a need in the art for enhanced seismic acquisition systems, methods, computer program products, and computer-implemented methods that provide a seismic trace of enhanced resolution compared to that for a conventional array response.

In view of the foregoing, embodiments of the present invention advantageously provide systems, machines, computer program products, and computer-implemented methods for forming a seismic trace that is enhanced over conventional seismic acquisition techniques. The seismic array response for an array of real seismic sensors can be formed by recording seismic responses for each of a number of real seismic sensors for a certain length of time, filtering the sensor responses for noise and aliased data, correcting the sensor responses for any potential sensor malfunctioning, and summing the filtered and corrected sensor responses. Embodiments of the present invention advantageously provide additional data from the existing seismic signals to thereby create virtual signals that are summed into the sensor responses, thus advantageously providing an enhanced array response based on a virtual seismic array and a seismic trace of enhanced resolution over that provided by a response for an array including only the existing real sensors.

In the context of seismic imaging, enhanced resolution allows seismic features to be shown as separate and indistinguishable—such features are said to be "resolved." On the other hand, seismic features that merge, appearing as one, or become otherwise indistinguishable are said to be unresolved. Large frequency bandwidth and small spacing between features are required to detect critical subtleties in the earth structure. More specifically, this concept of resolution is referred to as vertical resolution. On the other hand, the term horizontal resolution refers to resolution among a set of traces rather than in a single trace. Because conventional seismic imaging techniques, and the mathematical foundations thereof, cannot account for the all of the information contained in the seismic response, statistical methods can be used to analyze and characterize signals in the seismic responses. Embodiments of the present invention use higher-order statistics to enhance the resolution of a seismic trace, provided that the seismic data is non-Gaussian seismic data.

Advantageously, embodiments of the present invention can be used, for example, to expand the frontier of oil and gas exploration capabilities beyond that provided by conventional array responses. Oil and gas exploration, in some respects, is limited by the quality of seismic images produced by conventional seismic acquisition techniques, which lack the ability to fully detect or represent certain subtle or nuanced geological phenomena that are may contain significant amounts of undiscovered petroleum. For example, petroleum seismology has long attempted to accurately portray certain geologic structures that elude conventional acquisition techniques. For example, structures such as stratigraphic traps may appear only as bright spots in seismic images of non-enhanced resolution. Higher resolution imaging is necessary to fully depict the attributes of these geologic structures. There may be other types of geologic structures having the potential to yield significant amounts of petroleum that, also, may be otherwise undetected or overlooked due to the limited resolution of conventional seismic technologies.

As seismic acquisition technology continues to advance, there will continue to be a need to provide a sufficiently high resolution to accurately capture and model nuanced and subtle differences in geologic structure. Also, exploration in certain environmentally sensitive areas demands enhanced seismic acquisition systems to minimize harmful environmental impacts of seismic acquisition. For example, there is a need to produce high-quality seismic data while taking measures to minimize the impact to the environment, such as limiting the strength of seismic energy sources and the number of seismic sensors deployed in the field. Accordingly, there is a need for seismic acquisition technology that can provide images of sufficient resolution under certain practical constraints, such as deploying a limited number of sensors in the field.

Embodiments of the present invention provide novel techniques for enhancing seismic array responses by constructing virtual sensors from the data collected by real sensors. Seismic data including that of the virtual sensors and the real seismic sensors are reflected in steering vectors and the fourth-order cross-cumulant tensor derived according to embodiments of the present invention. Processing using fourth-order direction-finding algorithms, for example, which can be implemented on one or more remote servers 130, can receive seismic data reflecting the virtual sensors and the real sensors and allows known seismic imaging techniques to produce a seismic image having an enhanced resolution over that from the real seismic sensors alone.

By way of reference to FIG. 3, seismic data 301 from a plurality of real seismic sensors are received so that they may be processed according to embodiments of the present invention. Such processing includes deriving the complex envelope 302 of the seismic data from the plurality of real seismic sensors, which advantageously enables certain specially-designed mathematical operators of embodiments of the present invention. Such processing further includes decomposing the seismic data into a series of narrow-band signals 303, which advantageously allows certain specially-designed mathematical operations of embodiments of the present invention to proceed where linear coefficients are independent of time. Further, specially-designed mathematical operators according to embodiments of the present invention assume that the incoming seismic data are narrow-band. Such processing also includes specially-designed mathematical operators for the statistical formulation to derive virtual sensors using the narrow-band decompositions 303 of the complex envelopes 302 of the seismic data 301. As can be shown with respect to FIG. 3, the statistical formulations include the array of steering vectors 304 and the fourth-order crosscumulants 305. The seismic data including that of the virtual sensors and the real seismic sensors are reflected in steering vectors 304 and the fourth-order cross-cumulant tensor 305 derived according to embodiments of the present invention. The steering vectors 304 and fourth-order crosscumulants 305 can be processed according to known fourth-order direction-finding algorithms 306 and known seismic imaging techniques to produce a seismic image 307 responsive to the seismic data from both the virtual sensors and the real seismic sensors. Advantageously, the seismic image 308 provides an enhanced resolution, by virtue of the seismic data from the virtual sensors, over that from the real seismic sensors alone.

The combination of real and virtual sensors is constructed from an equally weighted linear array, resulting in a weighted array of real and virtual sensors. Accordingly, embodiments of the present invention allow the introduction of new sensors in the seismic arrays as well as provide new weightings of the existing real sensors. As will be apparent to one of skill in the art, a key assumption behind this approach is that the seismic data is considered non-Gaussian, i.e., where the fourth-order crosscumulants of the real sensor responses are nonzero. By introducing new sensors into the seismic array and providing new weightings of the existing real sensors, embodiments of the present invention provide a way to enhance the resolution of the array response, to reduce the number of sensors used in the seismic array, or both. Embodiments of the present invention provide new virtual seismic sensors responsive to the existing real seismic sensors, and the combination of the existing real seismic sensors and the new virtual seismic sensors defines a virtual seismic array. For example, embodiments of the invention can provide a weighted virtual seismic array of nine sensors responsive to an equally weighted linear array of five existing real seismic sensors.

One embodiment of the present invention provides a system for forming an enhanced seismic trace. The system includes a number of real seismic sensors that sense a number of statistically independent seismic signals and generate a number of signal responses. The real seismic sensors are strategically positioned in a seismic array, also called a receiver, to receive energy propagated through the Earth's subsurface from a controlled seismic source. The sensors may include, for example, geophones, hydrophones, seismometers, velocity transducers, accelerometers. A seismic source may include, for example, dynamite, Tovex, an air gun, or a seismic vibrator. The system also includes a server for processing the signal responses and forming a seismic trace responsive to the processing. The server can be a computer having a processor and a memory, where the memory is a tangible computer-readable storage medium containing a computer program product or products that are operable on the processor. The server can link with the number of seismic sensors over any of various types of communication media known to those of skill in the art, including without limitation, hardwired connections, network connections, wireless radio and satellite connections, and so on. The computer program product includes a set of instructions for execution on the processor, which causes the server to perform a number of operations described further herein.

The server can first receive the signal responses from the real seismic sensors responsive to the real seismic sensors sensing the statistically independent signals. The server then forms a number of narrowband signals responsive to the signal responses. Based on the complex envelope of the narrowband signals, the server calculates a mixing matrix where the mixing coefficients are independent of time and calculates a covariance matrix and fourth-order crosscumulant matrix for the narrowband signals responsive to the mixing matrix. The server calculates a steering vector responsive to the mixing matrix which is used to define the virtual array, for introducing the virtual sensors to fourth order direction-finding methods. Accordingly, a seismic trace for the virtual array is formed using the steering vector as a steering vector for each of the signal responses for each of the real seismic sensors. The virtual seismic array is formed responsive to the steering vector and the enhanced seismic trace is formed responsive to the steering vector and the fourth-order direction finding methods, whereas the seismic trace has an enhanced resolution over a seismic trace for the original array of only real seismic sensors.

Another embodiment of the present invention provides a machine for forming an enhanced seismic trace. The machine can be a computer having a processor and a memory, where the memory is a tangible computer-readable storage medium containing a computer program product or products that are operable on the processor. The computer can be a dedicated server or any other type of computer known and available to those of skill in the art. The computer has an input/output unit for interfacing with a number of seismic sensors over communication media known to those of skill in the art, including without limitation hardwired links, network links, radio links, and satellite links. The computer program product includes a set of instructions for execution on the processor, which cause the server to perform a number of operations as described further herein. The machine can first receive the signal responses from the real seismic sensors through the input/output unit responsive to the real seismic sensors sensing the statistically independent signals. The machine then processes the signal responses from the real seismic sensors to form a virtual seismic array. The machine then introduces the virtual array to fourth order direction-finding methods to thereby form the seismic trace for the virtual array. The processing operation can include forming a plurality of narrowband signals responsive to the signal responses, and based on these narrowband signals, calculating a mixing matrix where the mixing coefficients are independent of time. Further, the processing operation can include calculating a covariance matrix and fourth-order crosscumulant matrix for the narrowband signals responsive to the mixing matrix. The forming of the seismic trace includes using the steering vector as a steering vector for each of the signal responses for each of the real seismic sensors. Accordingly, the virtual seismic array is formed responsive to the steering vector and the enhanced seismic trace is formed responsive to the steering vector and the fourth-order direction finding methods, whereas the seismic trace has an enhanced resolution over a seismic trace for the original array of only real seismic sensors.

Another embodiment of the present invention provides a computer program product or products on a computer-readable storage medium, the computer program product or products being operable on a processor of a computer. The computer program product includes a set of instructions for execution on the processor, which cause the computer to perform a number of operations. The computer can first receive the signal responses from the real seismic sensors responsive to the real seismic sensors sensing the statistically independent signals. The computer processes the signal responses from the real seismic sensors to form a virtual seismic array and introduces the virtual array to fourth order direction-finding methods to thereby form the seismic trace for the virtual array. The processing operation can include forming a plurality of narrowband signals responsive to the signal responses, and based on these narrowband signals, calculating a mixing matrix wherein the mixing coefficients are independent of time, and calculating a covariance matrix and fourth-order crosscumulant matrix for the narrowband signals responsive to the mixing matrix. The forming of the seismic trace can include using the steering vector as a steering vector for each of the signal responses for each of the real seismic sensors. Accordingly, the virtual seismic array is formed responsive to the steering vector and the enhanced seismic trace is formed responsive to the steering vector and the fourth-order direction finding methods, whereas the seismic trace has an enhanced resolution over a seismic trace for the original array of only real seismic sensors.

Another embodiment of the present invention provides computer-implemented methods for performing a number of steps for forming an enhanced seismic trace responsive to a plurality of (L) real seismic sensors that generate a plurality of seismic signal responses responsive to sensing a plurality of (I) statistically independent seismic signals originating from a seismic energy source and reflected from subterranean structures. The enhanced seismic trace allows a seismic image having an enhanced resolution to be generated responsive thereto. Such methods include receiving the signal responses from the real seismic sensors responsive to the real seismic sensors sensing the statistically independent signals. The methods further include processing the signal responses from the real seismic sensors to form a virtual seismic array and introducing the virtual array to fourth order direction-finding processing to thereby form the seismic trace for the virtual array. The methods also include forming a plurality of narrowband signals responsive to the signal responses, and based on these narrowband signals, calculating a mixing matrix where the mixing coefficients are independent of time, and calculating a covariance matrix and fourth-order crosscumulant matrix for the narrowband signals responsive to the mixing matrix. The forming of the seismic trace can include using the steering vector as a steering vector for each of the signal responses for each of the real seismic sensors. Accordingly, the virtual seismic array is formed responsive to the steering vector and the enhanced seismic trace is formed responsive to the steering vector and the fourth-order direction finding methods, whereas the seismic trace has an enhanced resolution over a seismic trace for the original array of only real seismic sensors.

Embodiments of the present invention can perform processing of the plurality of statistically independent signals for the plurality of sensors to define a plurality of virtual seismic sensors, using higher-order statistics and higher-order direction finding methods to create the seismic trace for the virtual array. In certain embodiments of the present invention, the signal output for the array is represented by its complex envelope, and thereafter, it is recast into a series of linear equations in which the linear coefficients are independent of time. The seismic data is decomposed into a series of narrow-band signals, and embodiments of the present invention perform the processes described further herein with respect to each of the derived narrow-band signals, the wideband signal being later recovered once the virtual signals have been created. Decomposition is performed using a filter-bank technique, which uses an array of band-pass filters to separate the input signal into a plurality of components, in a process known as analysis. Each component is understood to carry a single-frequency sub-band of the original signal. Those skilled in the art should appreciate that it is desirable to design the filter bank in such a way that sub-bands are later recombined to recover the wideband signal in a process called synthesis. The method can include steps for decomposing each seismic signal response of the plurality of seismic signal responses into one or more narrowband signals for the seismic signal response to thereby define a plurality of narrowband signals, responsive to receiving the plurality of seismic signal responses for the (I) statistically independent seismic signals from the plurality of (L) real seismic sensors. For each of the narrow-band signals in which the linear coefficients are independent of time, embodiments of the present invention derive a time-independent matrix of mixing coefficients for a vector of the array responses and a vector of the signal responses. Based on the matrix of time-independent mixing coefficients, higher order statistics are applied to derive the steering vector for the virtual sensors, and through fourth-order direction finding methods, form the seismic trace for the virtual array. Embodiments of methods include steps for calculating a plurality of fourth-order crosscumulants responsive to each of the plurality of narrowband signals to thereby define a plurality of fourth-order crosscumulants. For example, by establishing a relation between the covariance matrix and cross-cumulant tensor of the vector of the array responses and those of the vector of the signal responses, embodiments of the present invention can derive a virtual steering vector of the each single shot for the true array of real sensors, and thereby can provide an new array including the virtual signals. Embodiments of methods include steps for calculating a virtual steering vector for each of the plurality of (I) statistically independent seismic signals responsive to the fourth-order crosscumulants for the plurality of narrowband signals to thereby define a plurality of virtual steering vectors, each of the virtual steering vectors being a true steering vector for a virtual array of $(L^2)$ virtual sensors. The virtual arrays, for example, are integrated into existing seismic acquisition technology for producing a seismic image having enhanced resolution. Embodiments of methods include steps for generating an enhanced seismic trace comprising the plurality of fourth-order crosscumulants for the plurality of narrowband signals and the plurality of virtual steering vectors for each of the plurality of (I) statistically independent seismic signals so that the enhanced seismic trace is output to fourth-order direction-finding processing for the virtual seismic array responsive to the plurality of virtual steering vectors, the enhanced seismic trace allowing a seismic image having an enhanced resolution to be generated responsive thereto. Accordingly, virtual arrays are provided for adding virtual sensors to existing array of real sensors, assuming that seismic data are non-Gaussian, to enhance the array response, reduce the number of real sensors needed in the field, or both.

BRIEF DESCRIPTION OF THE DRAWINGS

Some of the features and benefits of the present invention having been stated, others will become apparent as the description proceeds when taken in conjunction with the accompanying drawings, in which:

FIG. 6 is a diagram illustrating a system according to embodiments of the present invention.

DETAILED DESCRIPTION

Figure 1:
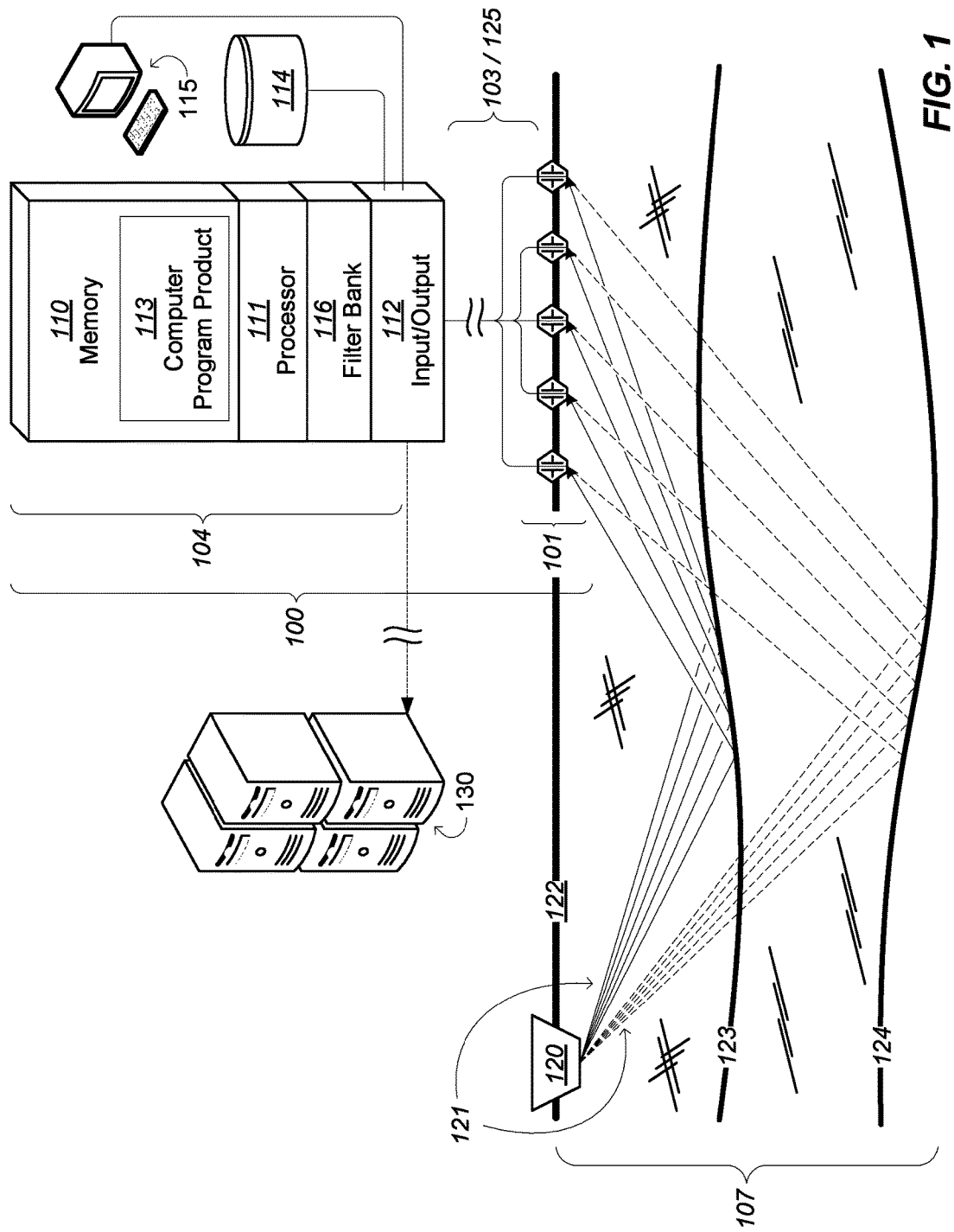
FIG. 1 is a diagram illustrating a system and a machine according to embodiments of the present invention.

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings. In the drawings and description that follows, like parts are marked throughout the specification and drawings with the same reference numerals, respectively. The prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness.

Embodiments of the present invention advantageously provide, for example, systems, machines, computer program products, and associated computer implemented methods for processing a plurality of seismic signal outputs and form a seismic trace by deriving virtual sensor data from fourth-order statistics of incoming real sensor data. This approach, for example, can enhance the array response, reduce the number of real sensors needed in the field, or both. Certain embodiments, for example, use specially designed mathematical operators that are implemented responsive to the complex envelope for each seismic signal response to define a plurality of seismic signal response envelopes and are further the plurality of narrowband signals and having mixing coefficients independent of time.

More particularly, embodiments of the present invention advantageously provide, for example, seismic processing machines, systems, computer implemented methods, and computer program products to calculate fourth-order crosscumulants for each of the plurality of narrowband signals for each of the plurality of statistically independent seismic signals to define a plurality of fourth-order crosscumulants, calculate a virtual steering vector for each of the plurality of (I) statistically independent seismic signals responsive to the fourth-order crosscumulants for the plurality of narrowband signals to define a plurality of virtual steering vectors, so that each of the virtual steering vectors can be used as a true steering vector for a virtual array of ($L^2$) virtual sensors, and process the plurality of fourth-order crosscumulants for the plurality of narrowband signals and the plurality of virtual steering vectors for each of the plurality of (I) statistically independent seismic signals using fourth-order direction-finding methods to define a seismic trace for the virtual seismic array responsive to the steering vector of size ($L^2$) having an enhanced resolution over a seismic trace for the real seismic array. Various embodiments of the invention, for example, can beneficially provide a virtual array having sensors weighted in amplitude. Various embodiments of the invention, for example, can further provide a greater attenuation and sharpening the resolution of the array response, for example, by amplitude tapering so that the bandwidth of the virtual array is not twice as narrow as that of the real array, despite the fact that the physical size of the virtual array can be approximately two times greater than that of the real array.

Embodiments of the present invention, for example, use as a part of the filtering mechanism a filter-bank having an array of band-pass filters that separate the input signal into a plurality of components, each component of the plurality of components carrying a single-frequency sub-band of the original signal. According to various embodiments of the present invention, such a filter bank is able to decompose each seismic signal response envelope of the plurality of seismic signal response envelopes into one or more narrowband signals for the seismic signal response envelope, thereby defining a plurality of narrowband signals.

As is perhaps best illustrated by FIG. 1, various embodiments of the present invention can include, by way of example, a system 100 for forming an enhanced seismic trace comprising a plurality of (L) real seismic sensors 101 for sensing a plurality of (I) statistically independent signals 121. Generally, a seismic energy source 120 can emit seismic waves into the earth 107 to evaluate subsurface conditions and to detect possible concentrations of oil, gas, and other subsurface minerals. Mathematically, seismic waves are waves of force that travel through an elastic body (such as the earth 107) as the result of a natural phenomena (such as an earthquake), a man-made energy (such as an explosion), or some other process that imparts forces into the elastic body (i.e., the earth 107). Seismic energy waves, for example, can occur naturally as the result of the pounding of ocean waves onto the shore. The propagation velocity of seismic waves can depends on the particular elastic medium through which the waves travel, particularly the density and elasticity of the medium as is known and understood by those skilled in the art. For instance, the propagation velocity of seismic waves can range from approximately three to eight (3-8) kilometers per second (km/s) in the earth's crust to up to thirteen (13) kilometers per second (km/s) in the earth's 80 deep mantle. Generally, in the field of geophysics, as is known and understood by those skilled in the art, the refraction or reflection of seismic waves onto a seismic energy sensor, e.g., one of the a plurality of (L) real seismic sensors 101, can be used to research and investigate subsurface structures of the earth 107.

Accordingly, real seismic sensors 101 can be positioned to receive and record seismic energy data or seismic field records in any form including, but not limited to, a geophysical time series recording of the acoustic reflection and refraction of waveforms that travel from the seismic energy source 120 to the seismic energy sensor 101. Variations in the travel times of reflection and refraction events in one or more field records in seismic data processing can be processed to produce a seismic image that demonstrates subsurface structure and can be used to aid in the search for, and exploitation of, subsurface mineral deposits.

Generally speaking, seismic sensor devices 101 can record sound wave echoes (otherwise known as seismic energy signal reflections) that come back up through the ground 107 from a seismic energy source 120 to a recording surface. Such seismic sensor devices 101 can record the intensity of such sound waves and the time it took for the sound wave to travel from the sound source (or seismic energy source) device 120 back to the seismic energy sensor device 101 at the recording surface. According to various exemplary embodiments of the present invention, for example, the reflections of sound waves emitted by a seismic energy source device 120, and recorded by a seismic energy recording device 101, can be processed by a computer to generate virtual sensor data to help either improve the resolution of the seismic image, reduce the number of sensors required to create a seismic image of a desired resolution, or both.

More specifically, the term seismic energy sensor 101, as is known and understood by those skilled in the art, can include geophones, hydrophones and other sensors designed to receive and record seismic energy. A geophone, generally speaking, is a seismic energy sensor device which converts ground movement (or displacement of the ground) into voltage which may be recorded at a recording station. A deviation of the measured voltage from a base line measured voltage produces a seismic response which can be analyzed and processed by a computer to produce a seismic image of subsurface geophysical structures. Although seismic energy waves propagating through the earth 107 are three-dimensional by nature, geophones are generally constrained to respond to a single dimension—typically the vertical dimension. Thus, geophones are often used in reflection seismology to record seismic energy waves reflected by the subsurface geology, such as exemplary subsurface formations 123 and 124.

Accordingly, by placing a plurality of geophone seismic energy sensors 101 at a recording surface, a two-dimensional seismic image can be produced responsive to voltage difference data collected by the geophone seismic energy sensors 101. Hydrophones, as are known and understood by those skilled in the art, are another type of seismic energy sensor device 101 designed specifically for underwater recording or listening to underwater sound. Most hydrophones are based on a piezoelectric transducer, as is known and understood by those skilled in the art, that generates electricity when subjected to a pressure change. Piezoelectric transducers can, accordingly, covert a seismic energy signal into an electric signal since seismic energy signals are a pressure wave in fluids.

According to an exemplary embodiment of the present invention, a plurality of (L) real seismic sensors 101 can be positioned to receive and record seismic energy data or seismic field records in any form including a geophysical time series recording of the acoustic reflection and refraction of waveforms that travel from the seismic energy source 120 to the seismic energy sensor 101. Variations in the travel times of reflection and refraction events in one or more field records in a plurality of seismic signals can, when processed by a computer, be used to produce a seismic image, according to techniques known to those having skill in the art, that demonstrates subsurface structure.

Each of the plurality of real seismic sensors 101 receives seismic signals 121 and generates seismic responses 125 representing the seismic signals. The real seismic sensors 101 can include, for example, analog or digital geophones or hydrophones, as will be appreciated by those having skill in the art. Likewise, the real seismic sensors 101 can receive seismic waves along multiple axes or only along certain axes, i.e., omni-directional or directional sensors. Any number of real seismic sensors 101 may be used, though FIG. 1 illustrates an embodiment using five real seismic sensors 101. In certain embodiments, real seismic sensors 101 are positioned in a substantially linear array, each real seismic sensor being spaced from adjacent real seismic sensors at equal intervals; such positioning can be defined or adjusted according to particular considerations, needs, and constraints known by those having skill in the art.

Responsive to the plurality of real seismic sensors 101 sensing a plurality of (I) statistically independent signals 121 generated by a seismic energy source 120 and reflected throughout earth media 107, the real seismic sensors 101 generate a plurality of responses. According to certain embodiments of the invention, the real seismic sensors 101 are in communication with a machine or server referred to herein as a virtual sensor processing unit (VSP) 104. In the embodiment illustrated in FIG. 1, the real seismic sensors 101 transmit their responses 125 using a wired connection 103. In other embodiments, the real seismic sensors 101 can communicate with the VSP 104 using a wireless connection implemented using antennae for transmitting and receiving wireless communication signals, as will be known to those having skill in the art.

With respect to FIG. 1, the real signal responses 125 are illustrated as travelling over wired connection 103 to the VSP 104 for processing the plurality of signal responses 125 and forming a seismic trace responsive thereto. The VSP 104 includes a processor 111, a memory 110, and an input/output unit (I/O) 112. As will be appreciated by those having skill in the art, the VSP 104 can be a dedicated server or a computer including specifically-designed hardware components or specially-designed computer program products residing in the memory 110.

The memory 110 is a non-transitory memory or more than one non-transitory memories being a tangible computer-readable storage medium. The non-transitory memory 110 can include and have stored thereon computer program product products, e.g., computer program product 113, having stored therein a computer program product operable on the processor 111. As one skilled in the art would appreciate, the memory 110 is not limited to any particular type of memory, but may include volatile and nonvolatile memories, including, for example, hard disks, flash memory, optical disks, and the like, and volatile memory, e.g., SRAM, DRAM, and SDRAM as required to support embodiments of the instant invention. As one skilled in the art will appreciate, though the non-transitory memory 110 is depicted on, e.g., a motherboard, of the VSP 104, the non-transitory memory 110 may also be a separate component or device, e.g., flash memory, connected to the VSP 104 through the I/O 112. As one skilled in the art will understand, the program product or products, along with one or more databases, data libraries, data tables, data fields, or other data records can be stored either in non-transitory memory 110 or in separate non-transitory memory, for example, associated with a storage medium such as database 114, positioned in communication with the VSP 104 through the I/O 112.

The processor 111 can be or include one or more microprocessors, microcontrollers, and other analog and/or digital circuit components configured to perform the functions described herein. The processor 110 is the "brains" of the VSP 110, and as such, it executes computer program product or products and works in conjunction with the I/O 112 to direct data to memory 110 and to send data or commands from the memory 110 to I/O 112. The processor 110 can be any commercially available processor, or plurality of processors, adapted for use in or with the VSP 104, e.g., Intel® Xeon® multicore processors, Intel® micro-architecture Nehalem, and AMD Opteron™ multicore processors.

Database 114 can be, for example, any sort of organized collection of data in digital form. Database 114 can include a database management system (DBMS) consisting of software that operates the database, provides storage, access, security, backup and other facilities. DBMS can support multiple query languages, including, for example, SQL, XQuery, OQL, LINQ, JDOQL, and JPAQL. Databases can implement any known database model or database models, including, for example, a relational model, a hierarchical model, a network model, or an object-oriented model. The DBMS can include Data Definition Language (DDL) for defining the structure of the database, Data Control Language (DCL) for defining security/access controls, and Data Manipulation Language (DML) for querying and updating data. DBMS can further include a relational engine to implement relational objects such as Table, Index, and Referential integrity constraints. DBMS can further include a storage engine to store and retrieve data from secondary storage, as well as managing transaction commit and rollback, and backup and recovery. In certain embodiments, the VSP 110 also includes a terminal 115 which may have a terminal for interfacing with a user, for example, for purposes of configuration and interaction with the computer program product 113 or database 112.

The computer program product 113 includes instructions that, when executed by the processor, cause the VSP 104 to receive the plurality of signal responses 125, process the plurality of signal responses 125 to define a virtual seismic array, and forming a seismic trace 105 for the virtual seismic array. The VSP 104 is a machine for forming an enhanced seismic trace responsive to receiving the plurality of signal responses 125 at an input/output unit 112 and having the processor 111 positioned to process the received plurality of signal responses 125 and form a seismic trace 105 responsive thereto.

In further detail, for each (l) of (L) real seismic sensors 101, the VSP 104 receives (k) number of signal responses 125 for each of the (I) statistically independent signals 121. The (k) signal response 125 is received at the processor 111 of the VSP 104 from the (l) real seismic sensor 101 by way of the communication link 103 in communication with the I/O 112 of the VSP 104. The array response of this array is shown by equation [1]. In equation [1], $D_l(t)$ is the signal output of the l-th sensor of the array, $S_k(t)$ is the k-th signal response, and $\tau_{lk}$ is the propagation delay between the first sensor (considered, here, as a reference) and the l-th sensor for the k-th signal.

$$D_l(t) = \sum_{k=1}^{I} S_k(t - \tau_{lk}) \quad [1]$$

Figure 2:
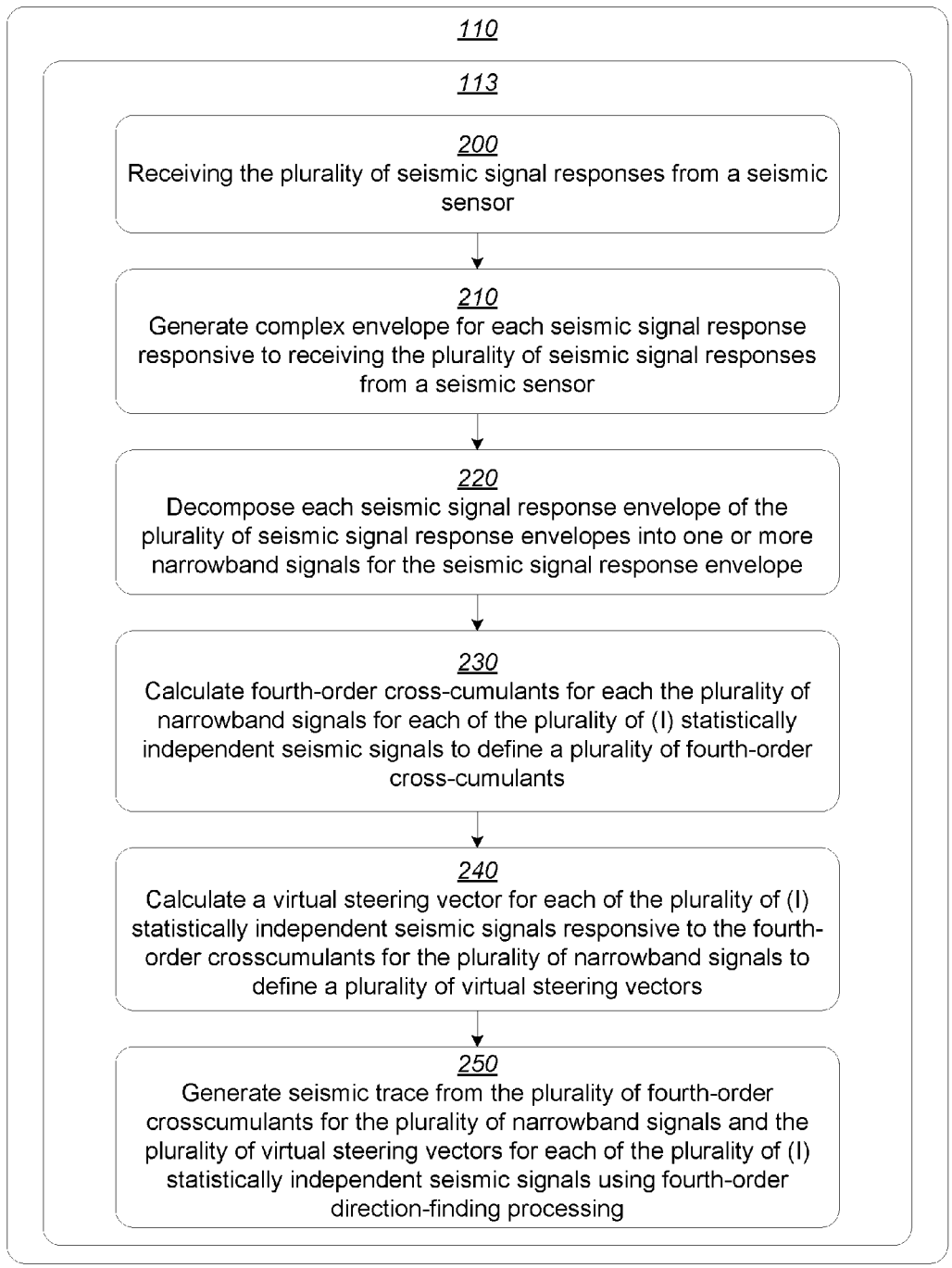
FIG. 2 is a flowchart illustrating the instructions of a computer program product and operations of computer implemented methods according to embodiments of the present invention.
Figure 3:
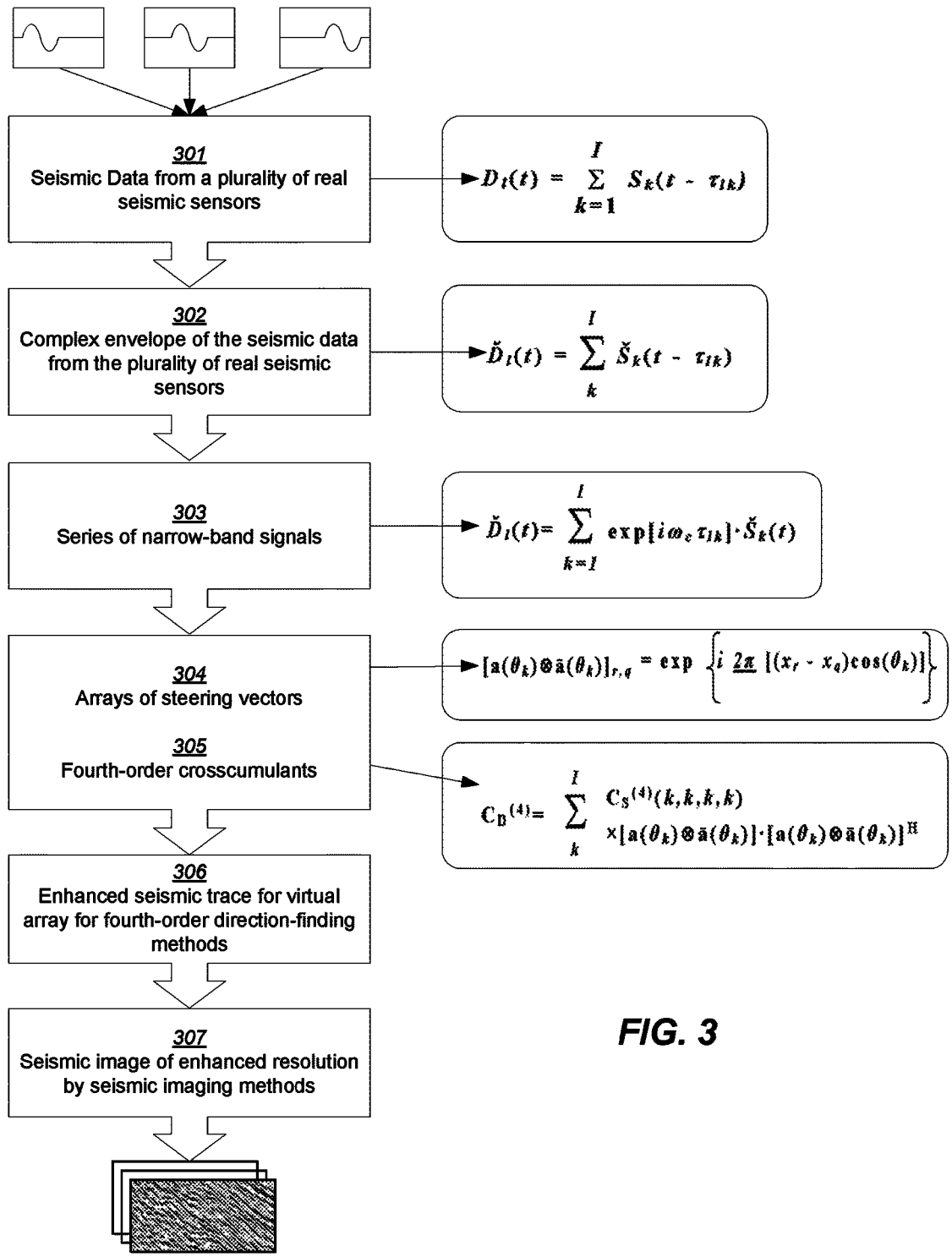
FIG. 3 is a flowchart illustrating a process flow according to embodiments of the present invention, including instructions of a computer program product and operations of computer implemented methods according to embodiments of the present invention.

The following description of operations of computer-implemented methods or computer program products proceeds with reference to computer program product 113 stored on memory 110 as can be shown in FIGS. 1 and 2. Those having skill in the art will understand, however, that any described instruction may consist of more than one instruction and any of the operations described may be performed by one or more than one computer program product, any of which may be stored in more than one memory.

A complex envelope can be generated for $D_l(t)$, the signal output of the l-th sensor of the array, and $S_k(t-\tau_{lk})$, the k-th signal response with respect to the propagation delay between the first sensor (considered, here, as a reference) and the l-th sensor for the k-th signal. The relationship between these complex envelopes can be shown by rewriting equation [1] as equation [2] in terms of the complex envelope of $D_l(t)$ and $S_k(t-\tau_{lk})$, where $\breve{D}_l(t)$ and $\breve{S}_k(t-\tau_{lk})$ are the complex envelopes of $D_l(t)$ and $S_k(t-\tau_{lk})$, respectively:

$$\breve{D}_l(t) = \sum_{k}^{I} \breve{S}_k(t - \tau_{lk}) \quad [2]$$

In embodiments of the invention as can be shown with respect to FIG. 2, computer program product 113 in the memory 110 of the VSP 104 includes an instruction 210 or instructions for generating a complex envelope for each seismic signal response responsive to receiving the plurality of seismic signal responses from the plurality of real seismic sensors. An envelope generator 600 may be a hardware module, a software module, or a combined hardware/software module, for example, including such instructions 210 and positioned to execute the same. The envelope generator 600 as a hardware module may include, for example, any of the memory 110, processor 111, and input/output module 112 as is described with respect to the VSP 104. The envelope generator 600 as a software module may reside, for example, on the memory 110 of the VSP 104 as a computer program product. The generated complex envelopes for each seismic signal response define a plurality of seismic signal response envelopes. As will be appreciated by those having skill in the art, the complex envelope may be generated by specifically designed hardware, such as an envelope generating circuit, or by specifically designed software, such as computer program product 113. Accordingly, each signal response $S_k(t)$ 125 corresponds to a statistically-independent signal (k) 121 sensed at a real seismic sensor (l) 101 with a propagation delay $\tau_{lk}$, each real seismic sensor (l) 101 having a sensor response $D_l(t)$ 125 being defined according to equations [1] and [2].

In embodiments of the invention as can further be shown with respect to FIG. 2, computer program product 113 in the memory 110 of the VSP 104 includes an instruction or instructions 220 for decomposing each seismic signal response envelope of the plurality of seismic signal response envelopes into one or more narrowband signals for the seismic signal response envelope. A signal decomposer 601 may be a hardware module, a software module, or a combined hardware/software module, for example, including such instructions 220 and positioned to execute the same. The resultant narrowband signals define a plurality of narrowband signals, which are responsive to the plurality of signal responses for the plurality of real seismic sensors. The signal decomposer 601 as a hardware module may include, for example, any of the memory 110, processor 111, and input/output module 112 as is described with respect to the VSP 104. The signal decomposer 601 as a software module may reside, for example, on the memory 110 of the VSP 104 as a computer program product. Seismic data $D_l(t)$ is decomposed into a series of narrowband signals using a filter bank 116, which is an array of band-pass filters for separating the input signal into a plurality of components, each component of the plurality of components carrying a single-frequency sub-band of the original signal. The filter bank can be designed and implemented so that the frequency sub-bands can be later recombined to later recover the original signal— the first process is called analysis, and the second is called synthesis. The filter bank is used to decompose the wideband signals into different narrowband signals, which advantageously allows the calculations embodied in the present invention to operate on the incoming signals to the sensors as if they are narrowband. Accordingly, the calculations embodied in the present invention are performed for all the narrowband components of the original signals then the narrowband components are recovered into the wideband signal through synthesis.

Forming the plurality of narrowband signals is shown by equation [3], which is a recast of equation [2], for the array response of the array of real sensors into a series of linear equations in which the linear coefficients are independent of time. For the narrowband signals, the complex envelope $\breve{S}_k(t-\tau_{lk})$ is a phase shift of $\breve{S}_k(t)$, which advantageously allows the mixing coefficients to be expressed independent of time. This can be shown in equation [3], wherein: $\breve{S}_k(t)$ is the complex envelope of $S_k(t)$ and $\omega_c$ is the central angular frequency:

$$\breve{D}_l(t) = \sum_{k=1}^{I} \exp[i\omega_c \tau_{lk}] \cdot \breve{S}_k(t) \qquad [3]$$

In certain embodiments of the invention, as can further be shown with respect to FIG. 2, computer program product 113 in the memory 110 of the VSP 104 includes an instruction or instructions 230 for calculating fourth-order cross-cumulants for each of the plurality of narrowband signals for each of the plurality of (I) statistically independent seismic signals to define a plurality of fourth-order crosscumulants. A cumulant generator 602 may be a hardware module, a software module, or a combined hardware/software module, for example, including such instructions 230 and positioned to execute the same. The cumulant generator 602 as a hardware module may include, for example, any of the memory 110, processor 111, and input/output module 112 as is described with respect to the VSP 104. The cumulant generator 602 as a software module may reside, for example, on the memory 110 of the VSP 104 as a computer program product. Whereas equation [3] is based on narrowband signals and the mixing coefficients are independent of time, a mixing matrix of size (L)×(I) responsive to the plurality of narrowband signals and having mixing coefficients independent of time is derived according to equations [4], [5], and [6] where time delay $\tau_{lk}$ is expressed in terms of the direction of arrival time $\theta_k$, where $\tau_{lk}=(l-1)\theta_k$, and where $\breve{D}(t)$ describes an (L)-dimension vector of the array responses $\breve{S}(t)$ represents an (I)-dimension vector of the signal responses, and A represents the mixing matrix having a size (L)×(I).

$$\breve{D}(t) = A \cdot \breve{S}(t) \qquad [4]$$

$$A = [a(\theta_1), a(\theta_2), \ldots, a(\theta_N)] \qquad [5]$$

$$a(\theta) = [1, \exp\{-i\theta\}, \ldots, \exp\{-i(L-1)\theta\}]^T \qquad [6]$$

In embodiments of the invention as can further be shown with respect to FIG. 2, computer program product 113 in the memory 110 of the VSP 104 includes an instruction or instructions 240 for calculating a virtual steering vector for each of the plurality of (I) statistically independent seismic signals responsive to the fourth-order crosscumulants for the plurality of narrowband signals to define a plurality of virtual steering vectors. A steering vector generator 603 may be a hardware module, a software module, or a combined hardware/software module, for example, including such instructions 240. The steering vector generator 603 as a hardware module may include, for example, any of the memory 110, processor 111, and input/output module 112 as is described with respect to the VSP 104. The steering vector generator 603 as a software module may reside, for example, on the memory 110 of the VSP 104 as a computer program product. Each of the virtual steering vectors is used as a true steering vector for a virtual array of ($L^2$) virtual sensors. The virtual seismic array is responsive to the covariance matrix and crosscumulant matrix and the steering vector calculated with respect thereto. Statistical formulations [7] and [8], respectively the covariance matrix and fourth-order cross-cumulant tensor, are used to derive the virtual sensors (wherein $\otimes$ is the Kronecker product and H denotes the Hermitian transpose):

$$C_D^{(2)} = \sum_k C_S^{(2)}(k,k) \cdot a(\theta_k) \cdot a^H(\theta_k) \qquad [7]$$

$$C_D^{(4)} = \sum_k C_S^{(4)}(k,k,k,k) \times [a(\theta_k) \otimes \overline{a}(\theta_k)] \cdot [a(\theta_k) \otimes \overline{a}(\theta_k)]^H \qquad [8]$$

Equations [7] and [8] establish that the covariance matrix and fourth-order cross-cumulant tensor of $\breve{D}$ are related to those of $\breve{S}$, particularly with respect to the (L)×(L) matrix $C_D^{(2)}$ and the ($L^2$)×($L^2$) matrix $C_D^{(4)}$. The ($L^2$)×($L^2$) matrix $C_D^{(4)}$ has the same algebraic structure as the autocumulant $C_S^{(4)}(k,k,k,k)$ and the vector $[a(\theta_k) \otimes \overline{a}(\theta_k)]$ serves the same role in $C_D^{(4)}$ as that of $C_S^{(2)}(k,k)$ and $a(\theta_k)$, respectively, for $C_D^{(2)}$. Accordingly, the vector $[a(\theta_k) \otimes \overline{a}(\theta_k)]$ of equation [8] is an ($L^2$)-size vector that is virtual steering vector of each i-th single shot for the real array 101 of L sensors with coordinates expressed by $x_l$, thereby providing ($L^2$) sensors with (L) of them being real sensors and the others being virtual sensors.

In certain embodiments, as can be shown in FIG. 1, having an array of real sensors 101 that is a linear array, the vector $[a(\theta_k) \otimes \overline{a}(\theta_k)]$ is the true steering vector of the k-th signal for the equivalent or virtual array of ($L^2$) equivalent or virtual sensors. In such embodiments, the coordinates of ($N^2$) virtual sensors are $x_{rq}=x_r-x_q$, where $1 \leq r$ and $q \leq L$. Accordingly the virtual array can be provided for fourth-order direction finding methods as a virtual array of L identical sensors having $L_v=2N-1$ number of sensors. Such shows that the virtual array is also a linear array.

In embodiments having a linear array, a coordinate system exists wherein the (L) sensors have coordinates expressed as ($x_l$, 0, 0), $1 \leq l \leq L$. In such a coordinate system, the vectors $a(\theta_k)$ for a linear array are provided by equation [9].

$$a_l(\theta_k) = \exp\left\{i \frac{2\pi}{\lambda} x_l \cos(\theta_k)\right\} \qquad [9]$$

With respect to the coordinates of the virtual sensors, provided by $x_{rq}$, where $m=r+L(q-1)$, where $1 \leq r, q \leq L$, the m-th component of the vector $[a(\theta_k) \otimes \overline{a}(\theta_k)]$, which is denoted as $[a(\theta_k) \otimes \overline{a}(\theta_k)]_m$, or $[a(\theta_k) \otimes \overline{a}(\theta_k)]_{r,q}$, is provided by equation [10].

$$[a(\theta_k) \otimes \overline{a}(\theta_k)]_{r,q} = \exp\left\{i \frac{2\pi}{\lambda} [(x_r - x_q)\cos(\theta_k)]\right\} \qquad [10]$$

Certain embodiments of the present invention include a plurality of real sensors 101 for a virtual array of uniformly spaced linear array of sensors. By way of example, the sensor coordinates of the plurality of real sensors 101 and virtual sensors can be represented by equation [11].

$$x_{rq} = x_r - x_q = (r-q)\Delta x, 1 \leq r, q \leq L. \qquad [11]$$

In equation [11], the notation $\Delta x$ represents the inter-element spacing between sensors. According to equation [11], the uniformly-spaced linear array having a plurality of (L) number of real sensors produces a virtual array of $L_v = 2L-1$ different real and virtual sensors. Accordingly, fourth-order direction finding methods are able to process $L_v - 1 = 2(L-1)$ independent sources (real and virtual). Such a virtual array can be shown with reference to FIG. 4, which shows the plurality of (L) number of real sensors is shown for L=5. For a virtual array generated from sensors of a uniformly spaced linear array of five sensors, as can be shown in FIG. 4, the virtual array is advantageously weighted, although the original array is not. By way of example, the sensor of the virtual array at the coordinate $x_{rq}$ has a multiplicity of order $N-|r-q|$, and such is equivalent to a sensor that is weighted in amplitude by a factor $N-|r-q|$.

Figure 4:
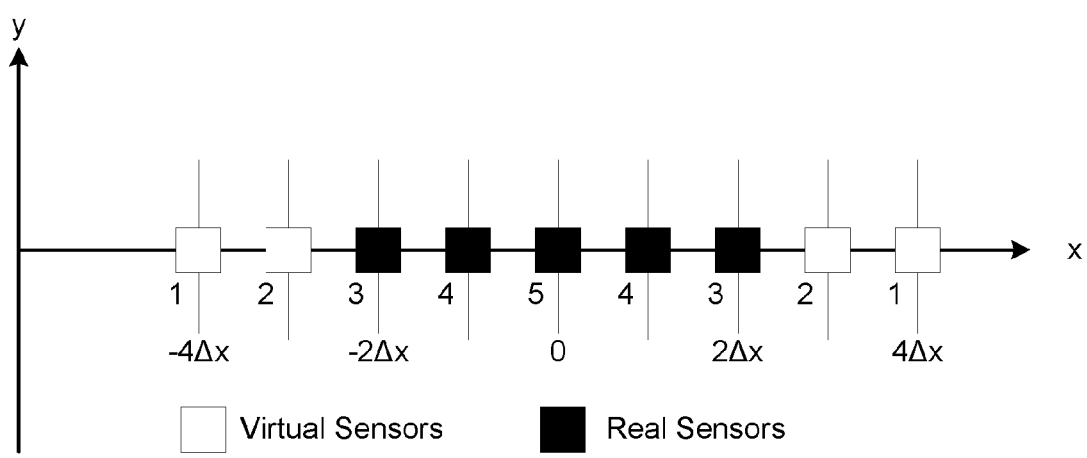
FIG. 4 is a graph of a virtual array obtained from a uniformly-spaced linear array of five sensors, the x-axis and the y-axis representing distance.
Figure 5A:
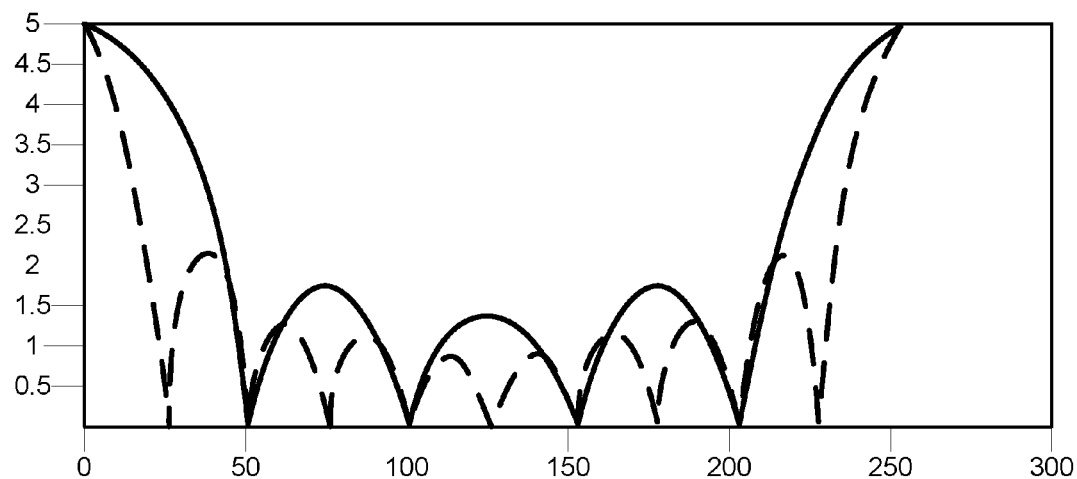
FIG. 5a is a graph having a solid line illustrating a real array response for the real sensors illustrated in FIG. 4 and a dashed line illustrating a real array response for double the number of real sensors illustrated in FIG. 4, the y-axis representing amplitude and the x-axis representing time.
Figure 5B:
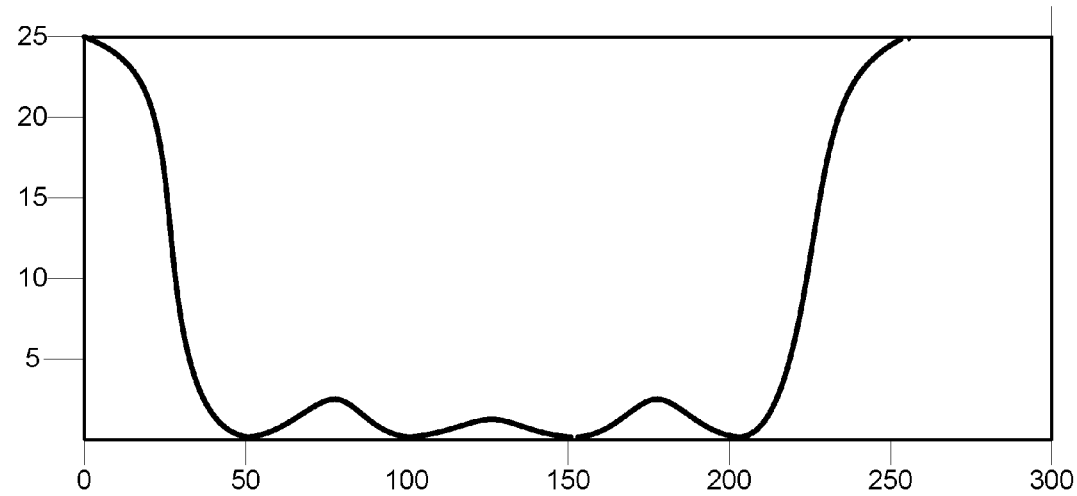
FIG. 5b is a graph showing a virtual array response for the array of real and virtual sensors illustrated in FIG. 4, the y-axis representing amplitude and the x-axis representing time.

As perhaps can be best shown with reference to FIG. 5B, the array response or seismic trace produced from a virtual array as shown in FIG. 4, wherein the plurality of (L) number of real sensors is shown for L=5, is an amplitude-tapered, uniformly spaced linear array of $2N-1$ sensors. The responses of a uniformly spaced linear array of five (5) real sensors, without virtual sensors added, can be shown with reference to the solid line in FIG. 5A. The responses of a uniformly spaced linear array of ten (10) (i.e., double the number of real sensors for the solid line) real sensors without virtual sensors added can be shown with reference to the dashed line in FIG. 5A. As is evident in FIG. 5A, increasing the number of real sensors increases the attenuation overall and sharpens the resolution of the response.

In contrast to the response for the real array of five (5) and ten (10) sensors, as is shown in FIG. 5A, the responses of a virtual array including nine (9) sensors (real and virtual) can be shown with reference to FIG. 5B. In the virtual array of FIG. 5B, five (5) of the uniformly spaced linear array are real sensors, e.g., the plurality of real sensors 101, The presence of amplitude tapering explains, in particular, comparing FIG. 5B and FIG. 5A, why the bandwidth of the virtual array is not twice as narrow as that of the real array, despite the fact that the number of sensors (i.e., virtual physical size) of the virtual array is approximately two times greater than that of the real array. Accordingly, the solid lines in FIGS. 5A and 5B illustrate that the enhanced resolution of a virtual array response has a resolution enhanced over that of a real initial array of five uniformly spaced real sensors of equal weights.

In embodiments of the invention as can further be shown with respect to FIG. 2, computer program product 113 in the memory 110 of the VSP 104 includes an instruction or instructions 250 for generating and outputting the plurality of fourth-order crosscumulants for the plurality of narrow-band signals and the plurality of virtual steering vectors for each of the plurality of (I) statistically independent seismic signals for processing using fourth-order direction-finding methods. A seismic trace generator 604 may be a hardware module, a software module, or a combined hardware/software module, for example, including such instructions 250. The seismic trace generator 604 as a hardware module may include, for example, any of the memory 110, processor 111, and input/output module 112 as is described with respect to the VSP 104. The seismic trace generator 604 as a software module may reside, for example, on the memory 110 of the VSP 104 as a computer program product. Various fourth-order direction-finding processing methods, for example, MUSIC (an acronym for "Multiple Signal Classification") algorithms are known to those having skill in the art. As can be shown in FIG. 1, such algorithms can be implemented, for example, on the remote server 130 executing fourth-order direction-finding algorithms. Such processing introduces the virtual array concept to fourth-order direction-finding methods, allowing a seismic trace to be formed for the virtual seismic array responsive to the steering vector of size ($L^2$) and the fourth-order crosscumulants for the plurality of narrowband signals and the plurality of virtual steering vectors for each of the plurality of (I) statistically independent seismic signals. As has been shown with reference to FIGS. 5A and 5B, the resolution of the resulting seismic trace is enhanced in comparison to the seismic trace for the real seismic array. The operation of forming a seismic trace for the virtual seismic array responsive to fourth-order direction-finding algorithms for the virtual seismic array includes using the steering vector of size ($L^2$) as a steering vector for each of the plurality of signal responses for each of the plurality of real seismic sensors to define a virtual seismic array having ($L^2$) sensors.

Accordingly, the present invention presents a series of processing steps, e.g., steps 200-250, before forming the arrays whereby additional sensors are constructed from the real sensors. The additional seismic information for the virtual sensors are present in the steering vectors and is derived according to embodiments of the present invention as described herein. The additional virtual sensors advantageously enhance the resolution of the array response, reduce the number of sensors used in the seismic array, or both. As can be shown with reference to FIGS. 4, 5A, and 5B, the addition of the virtual sensors to a the uniformly-spaced linear array having a plurality of L number of real sensors produces a virtual array of $L_v=2L-1$ different real and virtual sensors that is weighted in amplitude by a factor $N-|r-q|$, the response for which is amplitude-tapered and beneficially maintains the bandwidth of the virtual array of the real array, despite the fact that the physical size of the virtual array is two times greater than that of the real array.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A method to generate seismic images of enhanced resolution, the method comprising:
   physically positioning a plurality of real seismic sensors in an array, the plurality of real seismic sensors comprising a number of real seismic sensors;
   obtaining a plurality of wideband seismic signals via the plurality of real seismic sensors physically positioned in an array;
   dividing each of the plurality of wideband seismic signals into one or more narrowband signals;
   transforming each of the one or more narrowband signals into a complex-value form, the complex-value form comprising phase and amplitude;
   creating a number of virtual seismic sensors responsive to a second-order covariance matrix and a higher-order covariance matrix of an order higher than the second-order covariance matrix for the one or more narrowband signals;
   transforming each of the one or more narrowband signals into the time-space domain responsive to the plurality of real seismic sensors and the virtual seismic sensors to form a virtual array of seismic sensors, the virtual array of seismic sensors comprising the plurality of real seismic sensors and the virtual seismic sensors, the virtual array of seismic sensors representing an increased number of seismic sensors comprising a total of the number of real seismic sensors and the number of virtual seismic sensors;

combining the one or more transformed narrowband signals to generate reconstructed wideband seismic signals of enhanced resolution; and generating, using the reconstructed wideband seismic signals of enhanced resolution, a seismic image of subsurface geophysical structures having an enhanced resolution corresponding to the increased number of seismic sensors of the virtual array.

2. A method as defined in claim 1, wherein dividing each of the plurality of wideband seismic signals into one or more narrowband signals is responsive to a filter bank that includes a plurality of band-pass filters for separating each of the plurality of wideband seismic signals into one or more components.

3. A method as defined in claim 1, wherein transforming each of the one or more narrowband signals into a complex-value form is responsive to one or more complex envelopes.

4. A method as defined in claim 1, wherein the higher-order covariance matrix is a fourth-order covariance matrix thereby to define a quadricovariance matrix, and wherein the number of the plurality of wideband seismic signals is the number of the plurality of real seismic sensors to the second power.

5. A method as defined in claim 1, wherein the higher-order covariance matrix is a sixth-order covariance matrix thereby to define a hexacovariance matrix, and wherein the number of the plurality of wideband seismic signals is the number of the plurality of real seismic sensors to the third power.

6. A method as defined in claim 1, wherein the plurality of wideband seismic signals are statistically independent.

7. A method as defined in claim 1, wherein combining the one or more transformed narrowband signals to generate reconstructed wideband seismic signals of enhanced resolution comprises, for each of the plurality of wideband seismic signals, combining the one or more transformed narrowband signals corresponding to the one or more narrowband signals of the wideband seismic signal to generate a reconstituted wideband seismic signal of enhanced resolution corresponding to the wideband seismic signal.

8. A machine to generate seismic images of enhanced resolution, the machine comprising:
one or more processors;
one or more input/output units in communication with the one or more processors and further in communication with a plurality of real seismic sensors physically positioned in an array and configured to sense a plurality of wideband seismic signals, the plurality of real seismic sensors comprising a number of real seismic sensors; and
non-transitory computer-readable medium positioned in communication with the one or more processors and having one or more computer programs stored thereon including a set of instructions that when executed by the one or more processors cause the one or more processors to perform operations of:
obtaining the plurality of wideband seismic signals via the plurality of real seismic sensors physically positioned in the array;
dividing each of the plurality of wideband seismic signals into one or more narrowband signals;
transforming each of the one or more narrowband signals into a complex-value form, the complex-value form comprising phase and amplitude;
creating a number of virtual seismic sensors responsive to a second-order covariance matrix and a higher-order covariance matrix of an order higher than the second-order covariance matrix for the one or more narrowband signals;
transforming each of the one or more narrowband signals into the time-space domain responsive to the plurality of real seismic sensors and the virtual seismic sensors to form a virtual array of seismic sensors, the virtual array of seismic sensors comprising the plurality of real seismic sensors and the virtual seismic sensors, the virtual array of seismic sensors representing an increased number of seismic sensors comprising a total of the number of real seismic sensors and the number of virtual seismic sensors;
combining the one or more transformed narrowband signals to generate reconstructed wideband seismic signals of enhanced resolution; and
generating, using the reconstructed wideband seismic signals of enhanced resolution, a seismic image of subsurface geophysical structures having an enhanced resolution corresponding to the increased number of seismic sensors of the virtual array.

9. A machine as defined in claim 8, wherein the machine further comprises a filter bank that includes a plurality of band-pass filters for separating each of the plurality of wideband seismic signals into one or more components, and wherein dividing each of the plurality of wideband seismic signals into one or more narrowband signals is responsive to the filter bank.

10. A machine as defined in claim 8, wherein transforming each of the one or more narrowband signals into a complex-value form is responsive to one or more complex envelopes.

11. A machine as defined in claim 8, wherein the higher-order covariance matrix is a fourth-order covariance matrix thereby to define a quadricovariance matrix, and wherein the number of the plurality of wideband seismic signals is the number of the plurality of real seismic sensors to the second power.

12. A machine as defined in claim 8, wherein the higher-order covariance matrix is a sixth-order covariance matrix thereby to define a hexacovariance matrix, and wherein the number of the plurality of wideband seismic signals is the number of the plurality of real seismic sensors to the third power.

13. A machine as defined in claim 8, wherein the plurality of wideband seismic signals are statistically independent.

14. A machine as defined in claim 8, wherein combining the one or more transformed narrowband signals to generate reconstructed wideband seismic signals of enhanced resolution comprises, for each of the plurality of wideband seismic signals, combining the one or more transformed narrowband signals corresponding to the one or more narrowband signals of the wideband seismic signal to generate a reconstituted wideband seismic signal of enhanced resolution corresponding to the wideband seismic signal.

15. Non-transitory computer-readable medium having one or more computer programs stored therein operable by one or more processors to generate seismic images of enhanced resolution, the one or more computer programs comprising a set of instructions that, when executed by the one or more processors, cause the one or more processors to perform the operations of:
obtaining a plurality of wideband seismic signals via a plurality of real seismic sensors physically positioned in an array, the plurality of real seismic sensors comprising a number of real seismic sensors;

dividing each of the plurality of wideband seismic signals into one or more narrowband signals;
transforming each of the one or more narrowband signals into a complex-value form, the complex-value form comprising phase and amplitude;
creating a number of virtual seismic sensors responsive to a second-order covariance matrix and a higher-order covariance matrix of an order higher than the second-order covariance matrix for the one or more narrowband signals;
transforming each of the one or more narrowband signals into the time-space domain responsive to the plurality of real seismic sensors and the virtual seismic sensors to form a virtual array of seismic sensors, the virtual array of seismic sensors comprising the plurality of real seismic sensors and the virtual seismic sensors, the virtual array of seismic sensors representing an increased number of seismic sensors comprising a total of the number of real seismic sensors and the number of virtual seismic sensors;
combining the one or more transformed narrowband signals to generate reconstructed wideband seismic signals of enhanced resolution; and
generating, using the reconstructed wideband seismic signals of enhanced resolution, a seismic image of subsurface geophysical structures having an enhanced resolution corresponding to the increased number of seismic sensors of the virtual array.

16. Non-transitory computer-readable medium having one or more computer programs stored therein as defined in claim 15, wherein dividing each of the plurality of wideband seismic signals into one or more narrowband signals is responsive to a filter bank that includes a plurality of band-pass filters for separating each of the plurality of wideband seismic signals into one or more components.

17. Non-transitory computer-readable medium having one or more computer programs stored therein as defined in claim 15, wherein transforming each of the one or more narrowband signals into a complex-value form is responsive to one or more complex envelopes.

18. Non-transitory computer-readable medium having one or more computer programs stored therein as defined in claim 15, wherein the higher-order covariance matrix is a fourth-order covariance matrix thereby to define a quadri-covariance matrix, and wherein the number of the plurality of wideband seismic signals is the number of the plurality of real seismic sensors to the second power.

19. Non-transitory computer-readable medium having one or more computer programs stored therein as defined in claim 15, wherein the higher-order covariance matrix is a sixth-order covariance matrix thereby to define a hexaco-variance matrix, and wherein the number of the plurality of wideband seismic signals is the number of the plurality of real seismic sensors to the third power.

20. Non-transitory computer-readable medium having one or more computer programs stored therein as defined in claim 15, wherein the plurality of wideband seismic signals are statistically independent.

21. Non-transitory computer-readable medium having one or more computer programs stored therein as defined in claim 15, wherein combining the one or more transformed narrowband signals to generate reconstructed wideband seismic signals of enhanced resolution comprises, for each of the plurality of wideband seismic signals, combining the one or more transformed narrowband signals corresponding to the one or more narrowband signals of the wideband seismic signal to generate a reconstituted wideband seismic signal of enhanced resolution corresponding to the wideband seismic signal.

* * * * *